A. JOËL.
SPRING DEVICE FOR VEHICLES.
APPLICATION FILED JAN. 21, 1921.
1,412,349.
Patented Apr. 11, 1922.
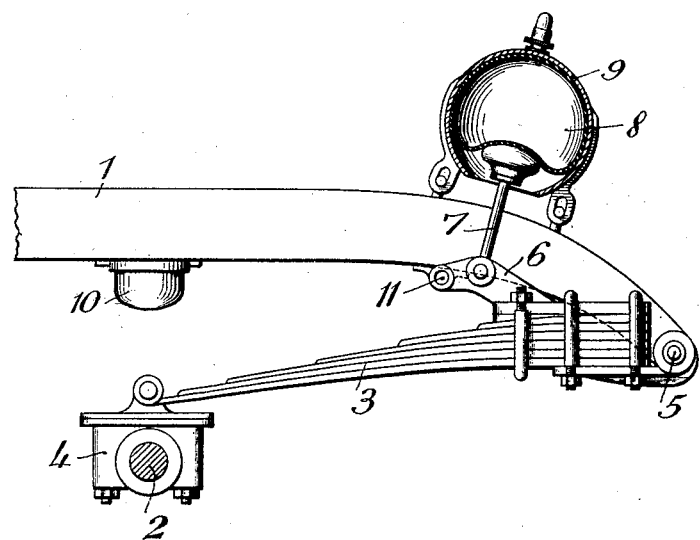

UNITED STATES PATENT OFFICE.

ALFRED JOËL, OF ZURICH, SWITZERLAND.

SPRING DEVICE FOR VEHICLES.

1,412,349. Specification of Letters Patent. Patented Apr. 11, 1922.

Application filed January 21, 1921. Serial No. 438,889.

*To all whom it may concern:*

Be it known that I, ALFRED JOËL, a citizen of the Republic of Switzerland, residing at Zurich, Switzerland, have invented certain new and useful Improvements in Spring Devices for Vehicles; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

The invention relates to improvements in spring devices for vehicles and particularly to that type in which a steel plate spring is combined with a pneumatic cushion device.

Spring devices are known in which a pneumatic spring device, consisting of an air cushion and a piston co-acting with the latter, is linked to a two-armed plate spring by means of a lever carrying said piston. With such arrangements the pneumatic cushion device serves solely as an auxiliary spring device so that the advantages of the pneumatic cushion device are only made use of to a very limited extent whereas the unfavorable qualities of the steel plate springs, for instance the considerable weight of the springs bearing on the axle, the large masses which render a quick action of the spring difficult and the oscillations occurring with such long plate springs, are not restricted in any way. Further the insertion of the pneumatic cushion device causes an increase in the length of the elastic connection between the axle of the vehicle and the frame, whereby the stability of the vehicle is greatly influenced by forces acting in the transverse direction.

The spring device for vehicles according to the present invention consists of the combination of a pneumatic cushion device with a one-armed plate spring serving to guide the axle of the vehicle which combination does not restrict the action of the pneumatic cushion device and which ensures stability of the vehicle against the action of forces acting in the transverse direction.

The rigid lever to which the piston co-acting with the air-cushion has been hitherto connected is dispensed with and is replaced by the one-armed plate spring which guides the axle of the vehicle and serves as a link for the said piston. A spring arrangement of this type comprises the advantages of a pneumatic cushion device, its weak springing action, as well as the advantages of the steel springs i. e. providing for stability of the vehicle against transversely acting forces, without having the above mentioned disadvantages of the ordinary steel springs. The oscillations of the plate spring are effectively damped in consequence of the difference in the frequency between the oscillations of the pneumatic cushion device and the oscillations of the plate spring. The spring device according to the present invention comprises qualities which heretofore have only been attained in a complicated manner by combining various devices.

One mode of carrying the invention into effect is shown by way of example on the accompanying drawing, which illustrates in a side view (some parts being shown in section), the device fitted to the rear part of the frame of a motor car.

In this drawing 1 indicates the frame of the motor car, 2 the rear axle and 3 the one-armed plate spring which is linked at its one end to the bearing 4, in which the axle is mounted. The other end of the plate spring 3 is linked to the frame 1 by means of a bolt 5 without any intermediate support or any interposed further link. To the plate spring 3 an arm 6 is rigidly fixed, to which the piston rod 7 is linked, which co-acts through the piston fixed thereto with the air cushion 8. The latter is enclosed in a casing 9 fixed to the frame 1. 10 designates a rubber buffer provided on the frame, against which buffer the axle abuts if a relative displacement between said two parts of sufficient magnitude occurs. The free end of the arm 6 is provided with an eye 11 into which a bolt may be inserted for fixing the arm 6 rigidly to the frame 1 if the pneumatic cushion device becomes defective, whereby said device may be cut out until after it has been repaired.

It is evident that the plate springs in the device illustrated transmits the relative movements between the axle and the frame of the vehicle to the pneumatic cushion device. The stroke of the piston of the latter is reduced as compared with the displacement of the axle by the ratio between the length of the plate spring 3 and the length of the arm 6. The pneumatic cushion device therefore requires little space. The plate spring and the pneumatic cushion device may be arranged comparatively closely to each other and as any intermediate parts are avoided which parts are apt to jam and therefore hinder the easy movement of a spring device, the spring device according to the invention acts in a reliable manner. An effective damping of the oscillating parts is effected owing to the unequal frequency of the oscillations of the plate spring and the pneumatic cushion device. To increase this effect the arm connecting the plate spring with the pneumatic cushion device is rigid.

I claim:

1. A vehicle spring comprising a one-armed plate spring arranged for connection at one end to a vehicle axle and at its opposite end to the vehicle frame, a rigid arm connected to said spring at the frame connecting end of said spring and extending between the ends of said spring, and an inflatable pneumatic cushion device on said frame and having a plunger connected to said arm.

2. A vehicle spring comprising a one-armed laminated spring arranged for connection at one end to a vehicle axle and its opposite thicker end for pivotal connection to the extreme end of the vehicle body frame, a rigid arm connected to the spring at such thicker end and extending toward the opposite end of such spring, and an inflatable, pneumatic cushion device on said frame having a plunger connected to said arm.

3. A vehicle spring comprising a one-armed plate spring arranged for connection at one end to a vehicle axle and at its opposite end to the vehicle frame, a rigid arm connected to said spring at the frame connecting end of said spring and extending between the ends of said spring, an inflatable pneumatic cushion device on said frame and having a plunger connected to said arm, and means on said arm to permit the pneumatic cushion device to remain inactive without affecting the operation of said spring.

4. A vehicle spring comprising a one-armed laminated spring arranged for connection at one end to a vehicle axle and its opposite thicker end for pivotal connection to the extreme end of the vehicle body frame, a rigid arm connected to the spring at such thicker end and extending toward the opposite end of such spring, and an inflatable pneumatic cushion device on said frame having a plunger connected to said arm, said arm having an eye for the reception of a temporary bolt to secure the end of the arm to the vehicle frame.

In testimony that I claim the foregoing as my invention I have signed my name.

ALFRED JOËL.